June 28, 1966 A. H. HANSON 3,257,863
CABLE CONSTRUCTION
Filed Aug. 12, 1963

INVENTOR.
Alfred H. Hanson
BY
Barnard, McGlynn & Reising
ATTORNEYS

United States Patent Office 3,257,863
Patented June 28, 1966

3,257,863
CABLE CONSTRUCTION
Alfred H. Hanson, Garrison, N.Y., assignor to Teleflex Incorporated, North Wales, Pa., a corporation of Delaware
Filed Aug. 12, 1963, Ser. No. 301,489
12 Claims. (Cl. 74—501)

This invention relates to a mechanical control and more particularly to a push or pull type control wherein an elongate core element is slidable longitudinally within a conduit such that the to or fro movement of a control lever or the like at one end of the conduit can be transmitted mechanically to the component to be controlled at the other end of the conduit.

Push or pull controls of the type described are widely used for example in aircraft, automobiles, boats and other automotive vehicles, in engine controls and the like for transmitting movement from the operators panel to the engine or other component to be controlled. In general, conventional such controls comprise a conduit and a core element within the conduit consisting of either a single cylindrical wire or a generally cylindrical helically wrapped strand of about a dozen or more wires.

To be ideal, such a control should not only have good strength but should also have a minimum slack or backlash in the movement of the core element within the conduit, along with maximum efficiency in transmitting the to and fro movement, i.e., minimum frictional or other resistance to the movement of the core element within the conduit. A conventional manner of accomplishing somewhat increased efficiency is to increase the clearance between the core and the conduit. However, this is seriously disadvantageous in a control intended for both push and pull movement since with increased clearance there is increased slack and backlash in the core movement during compression. Also, if an overly sloppy fit is used, only the inherent strength of the core element itself can be relied upon to provide the desired strength and constancy of length in compression whereas with a relatively snug fit the strength of the conduit against radial loads complements the strength of the core. It is precisely because good compressive strength and the avoidance of excessive slack are so important in push-pull controls that it is presently the preferred practice to use a relatively small clearance between the core and the conduit and let efficiency suffer.

It is an object of the present invention to provide an improved control of the type described which affords greatly increased efficiency without sacrifice in other desirable characteristics.

More specifically, it is an object of the present invention to provide a push or pull control having a novel combination of conduit and core structure which combination affords efficient low resistance longitudinal sliding movement of the core within the conduit, excellent core and conduit strength and minimum slack in core movement along with other desirable characteristics.

Briefly, the above objects are accomplished in accordance with the invention by a control assembly having a tube with a cylindrical bore, and a core extending through the tube in longitudinally slidable contact therewith, the core comprising an elongate member having from one to four generally longitudinally extending elongate raised portions with smooth rounded outer surfaces which spiral helically around the longitudinal axis of the core at a pitch angle of from 82° to 88°. At least one of the members, preferably the tube, must be made of or have its contacting surface made of an organic polymeric material; the core element should preferably be of metal, or metal coated with plastic, and the tube of an organic polymeric material of high inherent lubricity such as polytetrafluoroethylene, i.e., Teflon; the superpolyamides, i.e., nylon; or the polyalkylenes, for example polyethylene or polypropylene.

The core element can be made of a straight wire with another wire wrapped helically thereabout at the required pitch angle; or of two, three, or four wires wrapped helically together to provide the aforesaid pitch angle; or it can be made of a unitary elongate member formed with from one to four raised portions with smooth rounded outer surfaces which extend helically about the longitudinal axis at the required pitch angle. By the term "pitch angle," it is meant the angle between a line perpendicular to the longitudinal axis of the core and a line tangent to the raised portion at its point of intersection with the perpendicular line, and as indicated by the angle A in FIGURE 3 of the drawing and to be referred to hereinafter. Hence, the required pitch angle being from 82° to 88°, the helical raised portion, or, more properly, a line tangent thereto, will define an angle of from 2° to 8° to the core axis. While precise reasons are not known, it has been found that with this combination of core element and tube, efficiencies upwards of 95% are attainable even with small clearance between the core and the tube.

The above and other objects, features and advantages of the invention will appear more clearly from the following detailed description of specific embodiments thereof made with reference to the accompanying drawings in which:

FIGURE 12 is a view taken on line 12—12 of FIGURE 11.

Figure 1:
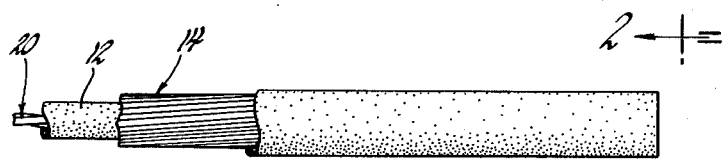
FIGURE 1 is a fragmentary side view, with parts broken away, of a preferred flexible push-pull control constructed in accordance with the invention.

Referring now to FIGURE 1, the control shown comprises a conduit having flexible tube 12 overlaid with a sheath 14 formed by a plurality of wires 16 helically wound on a long lead about the tube, this sheath 14 in turn being covered with a flexible casing 18. The assembly includes a movable core element 20 disposed within the tube 12 and described in detail hereinafter.

Tube 12 is formed of an organic polymeric material having inherent flexibility and preferably also good inherent lubricity. Highly desirable materials are the superpolyamide resins, commonly known as nylon, and polytetrafluoroethylene also known as Teflon. Such materials not only have good flexibility and lubricity, but are also quite tough and wear resistant and hence, provide exceptionally long life. In those instances where the operating requirements are not too severe and where lower conduit costs are important, less expensive plastic materials such as the polyalkylenes, for example, polyethylene, polypropylene and their copolymers, may be used to advantage.

Any of the aforementioned organic plastics may also be used for the flexible casing 18 which, like tube 12, is generally formed by extrusion. In general, the material and the wall thickness of the casing 18 should be such as to provide good flexibility commensurate with sufficient strength to accommodate, without rupture or permanent distortion, any radial loads imposed on it by the sheath 14 during conduit flexing. In the particular embodiment shown, the sheath 14 is formed by a full complement of metal wires 16, there being room in the complement, however, for slight spacing between the wires. For optimum conduit strength, particularly tensile strength, it is desirable that at least some and preferably a majority of the wires be of metal and more specifically a high tensile strength metal such as steel. If desired, the sheath can be of composite metal-plastic structure as covered by copending United States patent applications Serial No. 191,978 filed May 2, 1962, now Patent No. 3,192,795 and Serial No. 214,142 filed August 1, 1962, now Patent No. 3,177,901, both in the name of Donald R. Pierce and assigned to the assignee of the present invention. The capacity of the sheath to accommodate high radial loads can be enhanced, as is sometimes desirable, by helically winding a wire or fiber roving on a relatively short lead around the sheath 14, that is, between the sheath and the casing 18. Such structure is shown, for example, in United States Patent 3,063,303 issued November 13, 1962, to A. A. Cadwallader.

Figure 2:
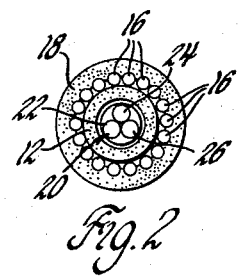
FIGURE 2 is a view, in enlarged scale, taken on the line 2—2 of FIGURE 1.
Figure 3:
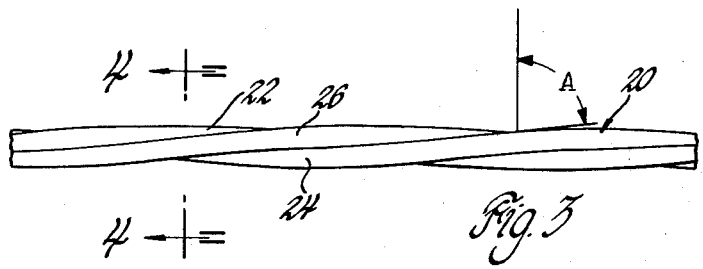
FIGURE 3 is a fragmentary side view, in enlarged scale, of the core element shown in FIGURE 1.
Figure 4:
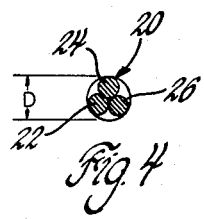
FIGURE 4 is a view taken on the line 4—4 of FIGURE 3.

Referring now to FIGURES 1–4, in accordance with the invention the core element 20 which extends through the tube 12 in longitudinally slidable contact therewith comprises three unitary or monofilament cylindrical metal wires 22, 24 and 26, all of the same diameter, wrapped helically with a lead which provides a pitch angle of from 82° to 88°, specifically, 87° in the particular embodiment shown. As alluded to previously, such pitch angle is indicated by the angle "A" in FIGURE 3. For push-pull controls in particular, where the core will sometimes be in compression, the helically extending wire should preferably be of such diameter as to provide a core outer diameter D (see FIGURE 4) which is less than the internal diameter of the tube 12 by from .003 to .012 inch. This difference in diameters assures that there will be some clearance and hence, no binding between the core and the tube albeit there are slight variations or inaccuracies in the diameters of the tube and the core wire within the usual manufacturing tolerances. Also, such clearance assures against any binding by reason of short radius curves in the tube which cause a slight oblongation thereof. In the particular embodiment shown in FIGURES 1 and 2, the inner diameter of the tube 12 is .083 inch and the diameter of each of the three wires in the core is .035 inch thereby providing a core outer diameter D of .075 inch. Hence, the difference between the internal diameter of the tube and the outer diameter of the core is .008 inch and when the core is centered in the tube, as shown in FIGURE 2, there will be a .004 inch average clearance between the core and the tube except of course at the location of any curves in the tube where the clearance will be slightly less. In the practice of the invention a choice can be made between the attainment of maximum efficiency and minimum slack or backlash. Where maximum efficiency is desired, the clearance between the core and the tube should be on the high side, for example a .01 inch difference between the O.D. of the core and the I.D. of the tube. On the other hand, if minimum slack or backlash is desired at a slight cost in efficiency, the amount of clearance should be set on the low side, for example a .003 difference in the aforesaid diameters. It bears emphasis, however, that with the practice of the present invention, the efficiency attainable for given amount of clearance between the core and the tube is far superior to the efficiency attainable with conventional flexible control constructions. For example, with the structure shown in FIGURES 1–4, and as described above, an efficiency upwards of 95% can be obtained with the .004 clearance, this as compared with efficiencies of only about 85% attainable with controls under the same load, using the same amount of clearance, the same oil or grease lubricant between the core and the tube, and of identical length and structure except that the core element was of conventional design, i.e., either a single cylindrical wire or a strand consisting of a large number of helically wound wires. For reasons not fully understood, the metal core element as described above only provides the greatly improved efficiencies when used in combination with an organic polymeric tube as distinguished from a metal tube. For example, with the metal core as shown in FIGURES 3 and 4, efficiencies only on the order of about 90% or less were attainable where a metal tube was used instead of a plastic tube.

It is also important to the attainment of the high efficiencies that the helically extending raised portions of the core have smooth rounded outer surfaces. It will be noted that this feature is inherent to the preferred core construction such as shown in FIGURES 1–4 since the wires from which the core is formed and which provide the helically extending raised portions are of cylindrical shape. Preferably the outer surfaces of the helically extending raised portions should have a radius of from about 15% to 30% of the internal diameter of the tube. In the FIGURES 1–4 embodiment, for example, the radius of each of the helically extending raised portions formed by each of the three wires respectively is .0175 inch, or approximately 21% of the I.D. of the tube.

Figure 5:
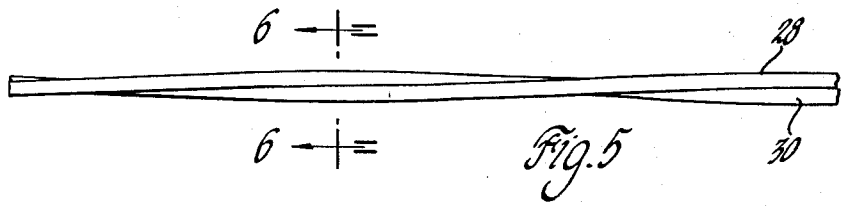
FIGURE 5 is a fragmentary side view of another preferred form of core element for the practice of the invention.
Figure 6:
FIGURE 6 is a view taken on the line 6—6 of FIGURE 5.

FIGURES 5 and 6 show a modified core element for the practice of the invention wherein only two helically wrapped metal wires 28 and 30 are used. In accordance with the invention, the pitch angle of these wires is within the range of from 82° to 88° and the core would, of course, be slidably supported in a plastic tube such as shown in FIGURES 1 and 2. For use with a tube having a .083 internal diameter, excellent low backlash performance at efficiencies on the order of 95% are attainable, with the FIGURES 5–6 modification, using wires having a diameter of about .039 inch helically wound at a pitch angle of 85°.

Figure 7:
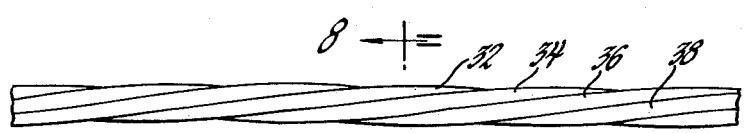
FIGURE 7 is a fragmentary side view of still another preferred form of core element for the practice of the invention.
Figure 8:
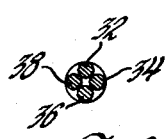
FIGURE 8 is a view taken on the line 8—8 of FIGURE 7.

FIGURES 7 and 8 show a modification wherein four wires, 32, 34, 36 and 38, are used to form the core. Typical dimensions for use of this core in combination with a plastic tube having an internal diameter of .1 inch are as follows: diameter of each of the four core wires, .035 inch; pitch angle of helix, 82°. Efficiencies on the order of 95% can be attained.

Figure 9:
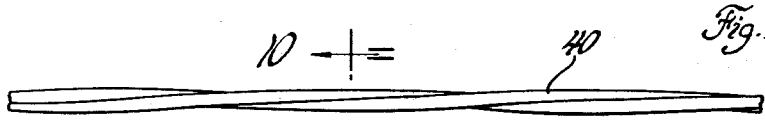
FIGURE 9 is a fragmentary side view of another form of core element for the practice of the invention.
Figure 10:
FIGURE 10 is a view taken on the line 10—10 of FIGURE 9.

FIGURES 9 and 10 show the invention wherein the core element consists of a unitary or monofilament metal wire 40 having a generally triangular cross section, but with rounded corners, and twisted such that the three raised portions formed by the rounded ridges or corners extend helically at a pitch angle of from 82° to 88°. Typical dimensions for such a core used with a plastic tube having an internal diameter of .2 inch are as follows: diameter of core, i.e., the diameter of the circle defined by rotation of a section of the core as shown in FIGURE 10, .194 inch; radius of each of the rounded corners or ridges, .05 inch; pitch angle of helically extending ridges, 88°. Efficiencies of about 94% to 96% can be attained.

It will be noted that the embodiment shown in FIGURES 9 and 10 constitutes a unitary or monofilament construction which corresponds in its number of helically extending raised portions to the core structure shown in FIGURES 3 and 4 wherein the core is formed by three helically wrapped wires. It will be manifest that a unitary or monofilament core construction corresponding to the FIGURES 5–6 modification wherein two wires are used would have a nonsquare rectangular cross section but with rounded corners, FIGURES 7–8 modification wherein four wires are used would have a square cross section though again with rounded corners.

Figure 11:
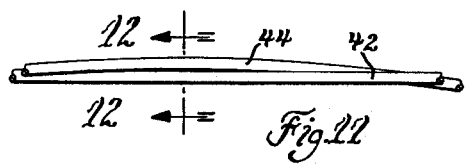
FIGURE 11 is a fragmentary side view of still another preferred form of core element for the practice of the invention.

FIGURES 11 and 12 show the invention wherein the core element consists of a straight wire 42 with another single wire 44 wrapped helically thereabout at the required pitch angle of from 82° to 88°. The core is, of course, slidably supported in a plastic tube as described above with respect to the other embodiments.

Where the particular control system in which the invention is to be used requires only a pulling motion or, in other words, where the core is to be put only in tension and not in compression, the amount of clearance between the core and the tube is an unimportant factor as regards the avoidance of core slack or backlash and hence, for optimum efficiency clearance greater than the aforementioned .012 inch can be used to advantage. In this way, efficiencies on the order of 98% are attainable. Of course, the usual grease or oil lubricants can and should be used in the controls of this invention as are used in conventional controls for lubrication between the core and tube.

It will be understood that while the invention has been described specifically with reference to certain embodiments thereof, various changes and modifications may be made all within the full and intended scope of the claims which follow.

I claim:

1. A mechanical control comprising a tube member with a cylindrical inner surface and an elongate core member in said tube slidably movable longitudinally therein, at least one of said members having its contacting surface made of an organic polymeric material, said core member having from one to four generally longitudinally extending elongate raised portions with smooth rounded outer surfaces which spiral helically around the longitudinal axis of the core member at a pitch angle of from 82° to 88°.

2. A mechanical control as defined in claim 1 wherein said core member is metal and said tube member is an organic polymeric material.

3. A mechanical control as defined in claim 1 wherein said core member is formed of from two to four cylindrical wires.

4. A mechanical control as defined in claim 1 wherein said core member comprises a unitary wire shaped to provide said elongate raised portions.

5. A mechanical control as defined in claim 1 wherein said core member is formed of from two to four cylindrical metal wires all of equal diameter wrapped helically about each other whereby each of said wires provides one of said elongate raised portions.

6. A mechanical control as defined in claim 1 wherein said tube member is of a material selected from the group consisting of polytetrafluoroethylene, the polyamides, the polyalkylenes and the polyalkylene copolymers.

7. A mechanical control comprising a tube member with a cylindrical inner surface and an elongate core member in said tube slidably movable longitudinally therein, at least one of said members having its contacting surface made of an organic polymeric material, said core member having from one to four generally longitudinally extending elongate raised portions with smooth rounded outer surfaces which spiral helically around the longitudinal axis of the core member at a pitch angle of from 82° to 88°, the outer diameter of said core member being less than the inner diameter of said tube member by from .003 to .012 inch.

8. A mechanical control as defined in claim 7 wherein the radius of curvature of each of said rounded outer surfaces is from 15% to 30% of the inner diameter of said tube member.

9. A mechanical control as defined in claim 7 wherein said core member is of metal and said tube member is of an organic polymeric material having good inherent lubricity.

10. A mechanical control as defined in claim 7 wherein said core member is formed of from two to four cylindrical metal wires all of the same diameter, wrapped helically about each other whereby each of said wires provides one of said elongate raised portions, the radius of each of said wires being from 15% to 30% of the inner diameter of said tube member.

11. A mechanical control comprising a flexible cylindrical tube of organic polymeric material overlaid with a sheath formed by a plurality of wires helically wound on a long lead about said tube, said sheath being covered by a flexible casing, and an elongate metal core in said tube slidably movable longitudinally therein, said core having from one to four generally longitudinally extending elongate raised portions with smooth rounded outer surfaces which spiral helically around the longitudinal axis of the core at a pitch angle of from 82° to 88°.

12. A mechanical control as defined in claim 11 wherein said core has an outer diameter which is less than the inner diameter of said tube by from .003 to .012 inch.

References Cited by the Examiner

UNITED STATES PATENTS

| 906,113 | 12/1908 | Curtis | 74—501 X |
|---|---|---|---|
| 2,036,528 | 4/1936 | Kesling | 74—501 X |
| 2,382,966 | 8/1945 | Arens | 74—501 |
| 2,438,053 | 3/1948 | Hettinga | 74—501 |
| 2,871,718 | 2/1959 | Schroeder | 74—501 |
| 3,130,754 | 4/1964 | Bratz | 138—133 |
| 3,177,901 | 4/1964 | Pierce | 138—130 |

FOREIGN PATENTS

| 1,294,854 | 4/1961 | France. |
|---|---|---|
| 360,291 | 11/1931 | Great Britain. |
| 608,934 | 9/1948 | Great Britain. |
| 651,817 | 4/1951 | Great Britain. |

MILTON KAUFMAN, *Primary Examiner.*

BROUGHTON G. DURHAM, *Examiner.*

C. F. GREEN, *Assistant Examiner.*